United States Patent
Cummins (10) Patent No.: US 10,104,972 B2
(45) Date of Patent: Oct. 23, 2018

(54) SHARED ARMREST (71) Applicant: Prism IP Licensing Co Pty Ltd, Southport (AU)

(72) Inventor: Michael Anthony Cummins, Southport (AU)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 78 days.

(21) Appl. No.: 15/300,279

(22) PCT Filed: Mar. 11, 2015

(86) PCT No.: PCT/AU2015/050095
§ 371 (c)(1),
(2) Date: Sep. 29, 2016

(87) PCT Pub. No.: WO2015/149120
PCT Pub. Date: Oct. 8, 2015

(65) Prior Publication Data
US 2017/0215592 A1    Aug. 3, 2017

(30) Foreign Application Priority Data
Mar. 29, 2014   (AU) ................ 2014901130

(51) Int. Cl.
*A47C 1/12*    (2006.01)
*A47C 7/54*    (2006.01)
*B61D 33/00*   (2006.01)
*B60N 2/75*    (2018.01)
(Continued)

(52) U.S. Cl.
CPC ............... *A47C 7/543* (2013.01); *A47C 1/03* (2013.01); *A47C 1/12* (2013.01); *B60N 2/753* (2018.02); *B60N 2/777* (2018.02); *B61D 33/005* (2013.01); *B64D 11/0644* (2014.12)

(58) Field of Classification Search
CPC .. A47C 1/12; A47C 7/54; A47C 7/543; B60N 2/75; B60N 2/753; B60N 2/763; B60N 2/777; B60N 2/46; B60N 2/4606; B60N 2/4626; B60N 2/4653; B61D 33/005; B64D 11/0644
See application file for complete search history.

(56) References Cited

U.S. PATENT DOCUMENTS

| 1,706,634 A | 3/1929 | Sells |
| 4,270,798 A | 6/1981 | Harder |
| 4,961,610 A | 10/1990 | Reeder |

(Continued)

FOREIGN PATENT DOCUMENTS

| GB | 2480998 A | 12/2011 |
| JP | 58102656 | 7/1983 |

(Continued)

*Primary Examiner* — Ryan D Kwiecinski
(74) *Attorney, Agent, or Firm* — Posz Law Group, PLC (57) ABSTRACT

A shared armrest includes two armrest members which are each configured for supporting a person's arm. The shared armrest is configured so that at least one of the armrest members is displaceable between an undivided condition and a split condition. In the undivided condition the armrest members are substantially together. In the split condition the armrest members diverge relative to each other with respective distal ends of the armrest members spaced apart from each other.

20 Claims, 12 Drawing Sheets (51) Int. Cl.
*B64D 11/06* (2006.01)
*A47C 1/03* (2006.01)

(56) References Cited

U.S. PATENT DOCUMENTS

| | | | |
|---|---|---|---|
| 5,232,190 A * | 8/1993 | Gould | B60N 3/102 |
| | | | 248/311.2 |
| 5,407,249 A | 4/1995 | Bonutti | |
| 5,433,509 A | 7/1995 | Hotary et al. | |
| 6,086,156 A | 7/2000 | Breen et al. | |
| 6,290,300 B1 * | 9/2001 | Sutton | A47C 1/03 |
| | | | 297/411.35 |
| 7,387,342 B1 | 6/2008 | Clough et al. | |
| 7,452,032 B1 | 11/2008 | Roleder et al. | |
| 9,216,665 B2 * | 12/2015 | Herault | B60N 2/00 |
| 9,630,720 B2 * | 4/2017 | Saint-Jalmes | B64D 11/0644 |
| 9,828,101 B2 * | 11/2017 | Shih | B64D 11/0646 |
| 2004/0021349 A1 | 2/2004 | Longtin et al. | |
| 2006/0202541 A1 | 9/2006 | Armo et al. | |
| 2009/0195045 A1 | 8/2009 | Lai | |
| 2011/0031785 A1 | 2/2011 | Steenson | |
| 2015/0165944 A1 * | 6/2015 | Almeida | B60N 2/4626 |
| | | | 297/411.31 |

FOREIGN PATENT DOCUMENTS

| | | | |
|---|---|---|---|
| JP | 58147458 | 10/1983 | |
| KR | 2003751770000 | 3/2005 | |
| KR | 1008063520000 | 2/2008 | |
| KR | 20037088000 | 11/2014 | |
| WO | WO9503969 | 2/1995 | |
| WO | WO-2014121038 A1 * | 8/2014 | A47C 7/543 |

\* cited by examiner

SHARED ARMREST

FIELD

The invention relates to a shared armrest. In particular, the invention relates to a shared armrest which provides separate armrest members for each person sharing the armrest.

BACKGROUND

It is well known that passengers experience discomfort in multiple seat arrangements where a single central armrest is shared by two persons. Sharing the central armrest can lead to dispute and discontent. The problem is particularly acute in the economy section of a passenger aircraft. Economy seating seeks to maximise the number of seats in a given area, thus shared armrests are necessarily very narrow.

Typically, where a single shared armrest is provided between two seats, only one person is able to use the armrest at any given time. Known single shared armrests used in economy-type seating have limited surface area for supporting an arm due to being narrow.

Figure 1:
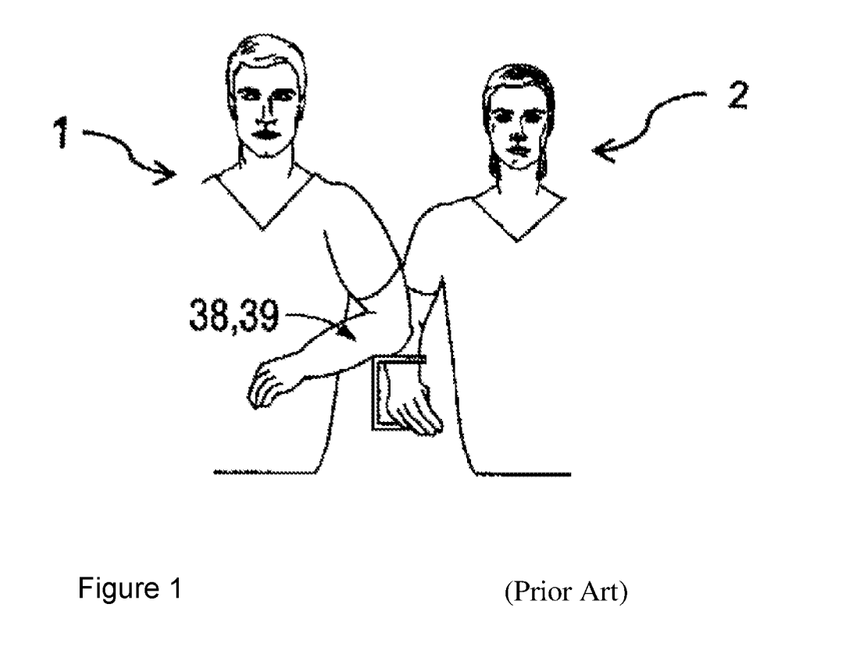
FIG. 1 shows a front view of the prior art armrest of U.S. Pat. No. 7,959,231.

U.S. Pat. No. 7,959,231 to Lee attempts to solve the problem by providing a shared armrest having two support surfaces which are spaced one above the other in the same horizontal plane. FIG. 1 of the drawings shows a front view of the stacked support surface armrest of Lee, in use. One of the drawbacks of the stacked support surface armrest of Lee is that the upper arms of the persons sharing the armrest need to overlap for effective use of the armrest. One person may thus be required to have his/her torso slightly forward and the other to have his/her torso slightly back so that their upper arms can overlap in order to have their forearms comfortably placed one above the other on the two vertically spaced armrest surfaces. This arrangement may be uncomfortable for the passengers. Another possible drawback is that the person resting his/her arm on the lower support surface may not be able to have his/her forearm supported centrally. In some embodiments the stacked support surface armrest of Lee has a leg or web extending from the lateral edge of the lower support surface to the lateral edge of the upper support surface. The leg or web may interfere with a central position of the forearm on the lower support surface.

SUMMARY

Various exemplary embodiments of a shared armrest, as described in this specification, can serve to address or ameliorate the problems and issues described in the above background.

Various exemplary embodiments of a shared armrest include two armrest members which are each configured for supporting a person's arm, wherein the shared armrest is configured so that at least one of the armrest members is displaceable between:

- an undivided condition wherein the armrest members are substantially together; and
- a split condition wherein the armrest members diverge relative to each other with respective distal ends of the armrest members spaced apart from each other.

The armrest members may be pivotally connected relative to each other by being pivotally connected to a support structure or to each other. In one embodiment, the shared armrest may include a support structure in the form of a hinge body. Proximal ends of the armrest members may be connected in a swivel manner to the hinge body. The armrest members may pivot or swivel about a shared pivot axis.

The hinge body may include knuckles and the proximal ends of the armrest members may also include knuckles. The knuckles of the armrest members may be interleaved with the knuckles of the hinge body to provide a joint assembly in which vertical movement of the armrest members is inhibited. The knuckles having arcuate recesses in which a stop formation is received to limit the range of pivoting of the armrest members.

The hinge body may be connectable to a seat or a frame in a hinged manner to provide hinged displacement of the armrest members in a plane transverse to the plane in which the armrest members swivel relative to each other.

The armrest members may have raised or enlarged distal ends which abut each other in the undivided condition to provide a gap between the armrest members. The gap allows a person to grip an armrest member to swing the armrest member to the split condition.

The armrest members may include flap portions which are operable to flap open to increase the surface area for supporting the person's arm.

The range of pivoting of the armrest member may be limited. In one example the range of pivoting of each armrest member is between 25° and 45° from the centred position in the undivided condition.

Exemplary embodiments of a row of seats include the shared armrest between adjacent seats as described hereinabove. The row of seats may include row terminating armrests which are operable to swing inwardly toward seatbacks of the row terminating seats.

DESCRIPTION OF THE EMBODIMENTS

In the drawings, reference numeral 10 generally indicates one embodiment of a shared armrest. The shared armrest 10 is secured between the seatbacks 25 of two seats 26.

The shared armrest 10 comprises two armrest members 12, 14 pivotally connected to a hinge body 16. The armrest members 12, 14 have distal ends 18 remote from the hinge body 16 and proximal ends 20 where the armrest members 12, 14 connect the hinge body 16.

Figure 2:
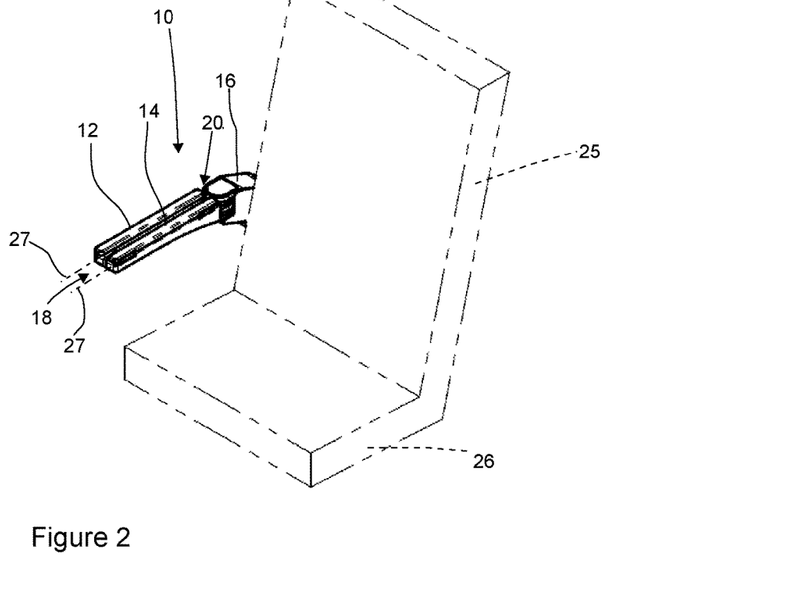
FIG. 2 shows a perspective view of a shared armrest in an undivided condition.
Figure 3:
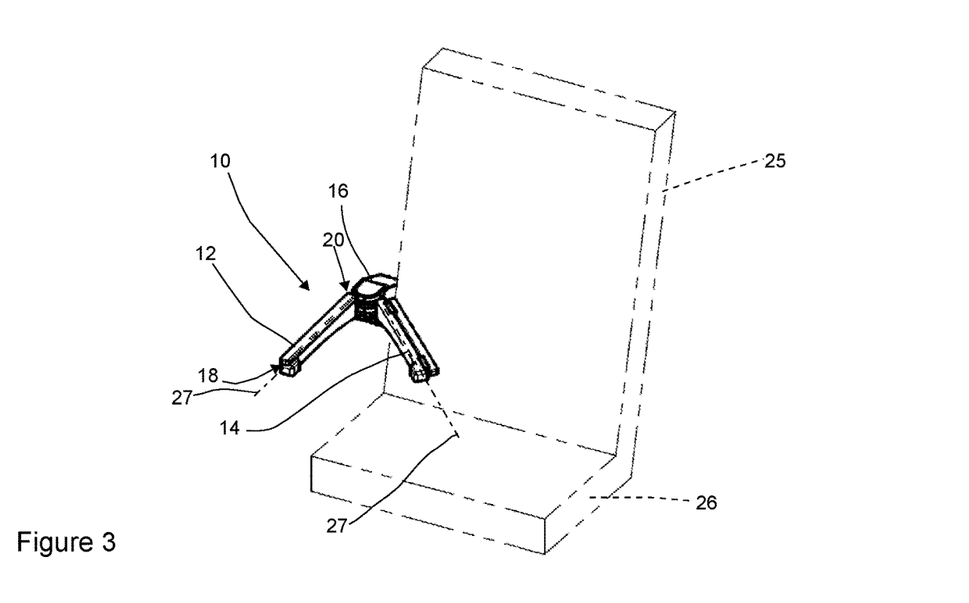
FIG. 3 shows a perspective view of the shared armrest in a split condition.
Figure 4:
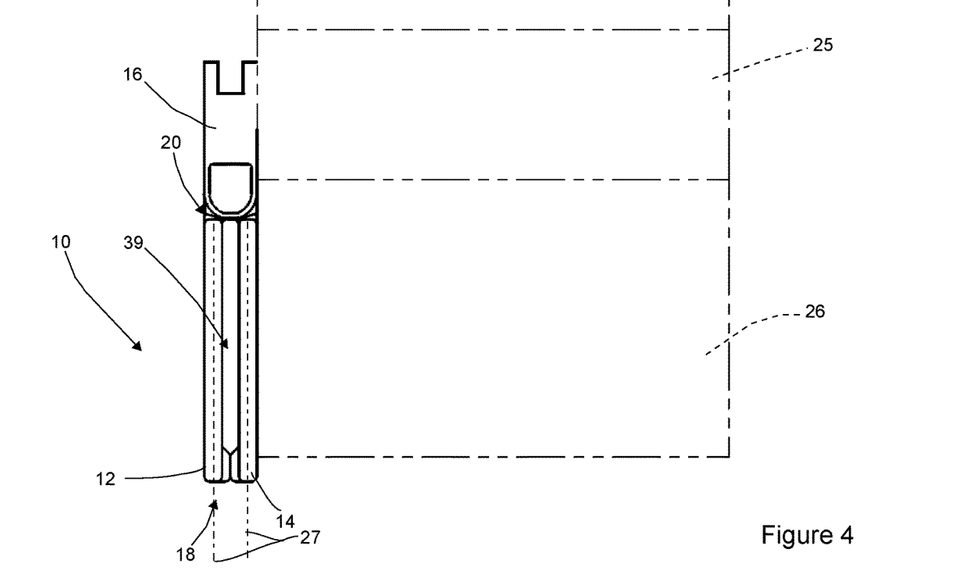
FIG. 4 shows a top view of the shared armrest in the undivided condition of FIG. 2.
Figure 5:
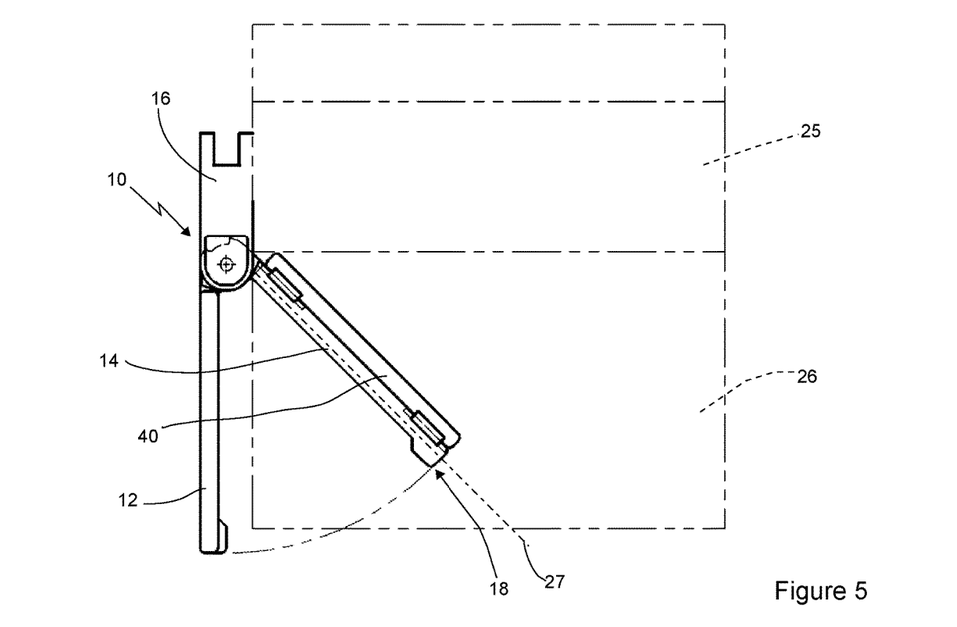
FIG. 5 shows top view of the shared armrest in the split condition of FIG. 3.
Figure 6:
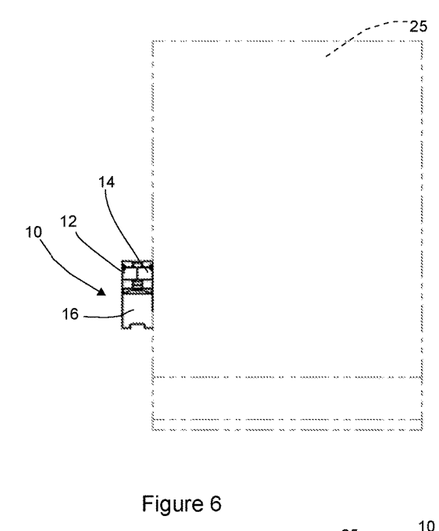
FIG. 6 shows a front view of the shared armrest in the undivided condition of FIG. 2.
Figure 7:
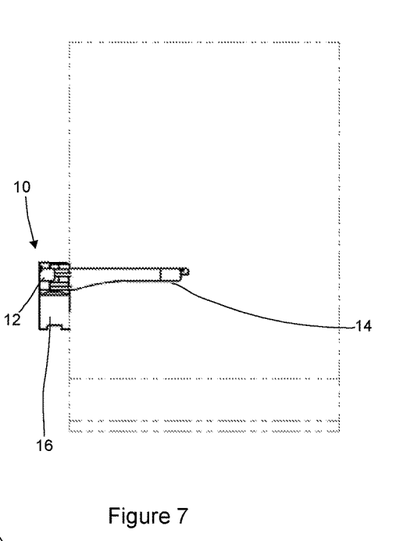
FIG. 7 shows a front view of the shared armrest in the split condition of FIG. 3.
Figure 8:
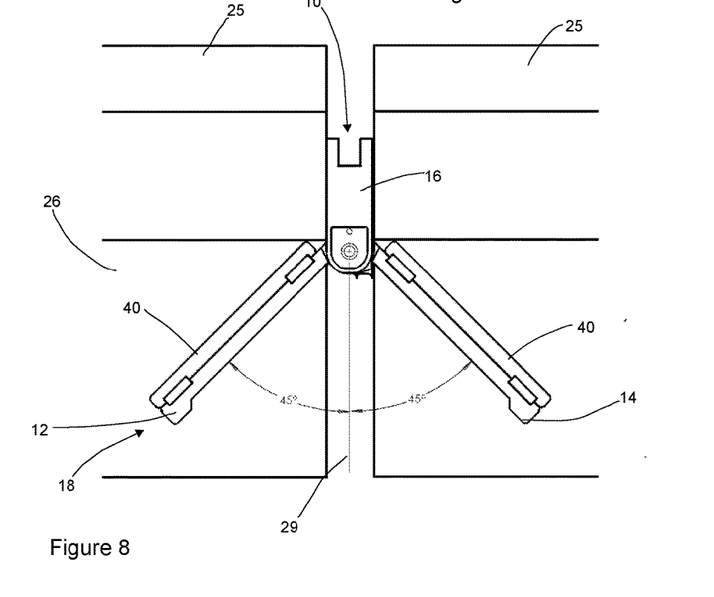
FIG. 8 shows a top view of the shared armrest of FIG. 2 in a split condition wherein both armrest members are pivoted open.

The armrest members 12, 14 can be pivotally displaced or swivelled between an undivided condition shown in FIGS. 2, 4, 6 and a scissored open or split condition shown in FIGS. 3, 5, 7 and 8. FIGS. 2, 4, and 6 show only one of the armrest members 14 swivelled towards the seatback 25 into the split condition. FIG. 7 shows both armrest members 12, 14 swivelled open towards the respective seatbacks 25. FIG. 8 shows the common swivel axis 28 about which the armrest members 12, 14 hinge or pivot from the hinge body 16.

The armrest members 12, 14 are elongate having a longitudinal axis 27 extending from the proximal ends 20 to their distal ends 18.

In the undivided condition, the two armrest members 12, 14 are substantially together in a side-by-side arrangement with their respective longitudinal axes 27 substantially parallel. The armrest members 12, 14 extend substantially parallel to each other in the undivided condition in a direction parallel to a centreline 29 between the seats 26.

Each armrest member 12, 14 can be pivoted or swivelled in a direction away from the centreline 29 towards the seatback 25 closest to the respective armrest member 12, 14. The range of pivoting is limited to not exceed between 25° and 45°, for example, with respect to the centreline 29. The armrest members 12, 14 diverge relative to each other to define an angle between them in the split condition. Only one of the armrest members 12, 14 may be angled out or diverge from the centreline 29 in the split condition of the shared armrest 10. In the split condition the distal ends 18 of the armrest members 12, 14 are spaced apart and the armrest members 12, 14 diverge so as to be angled relative to each other.

Figure 9:
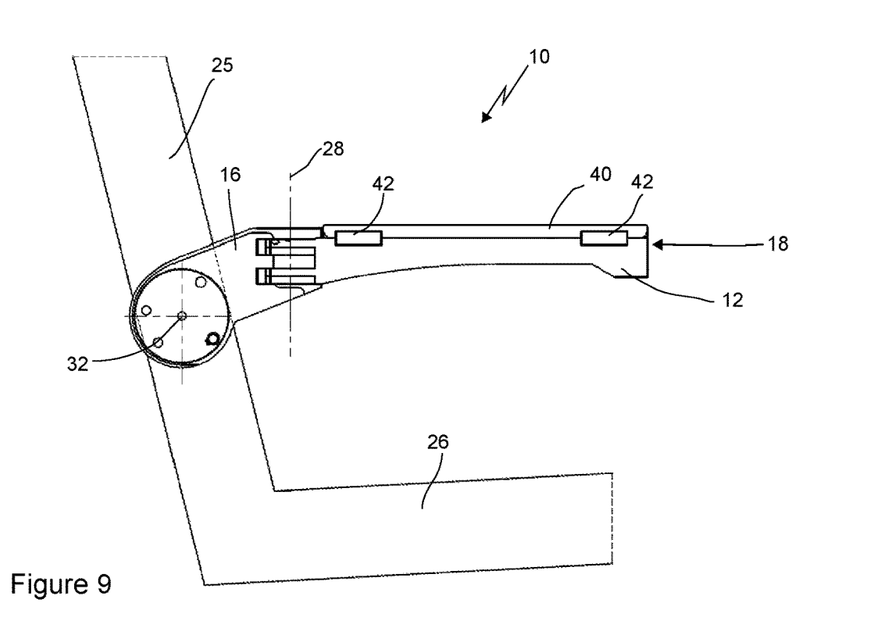
FIG. 9 shows a side view of the shared armrest of FIG. 2 in a deployed condition.
Figure 10:
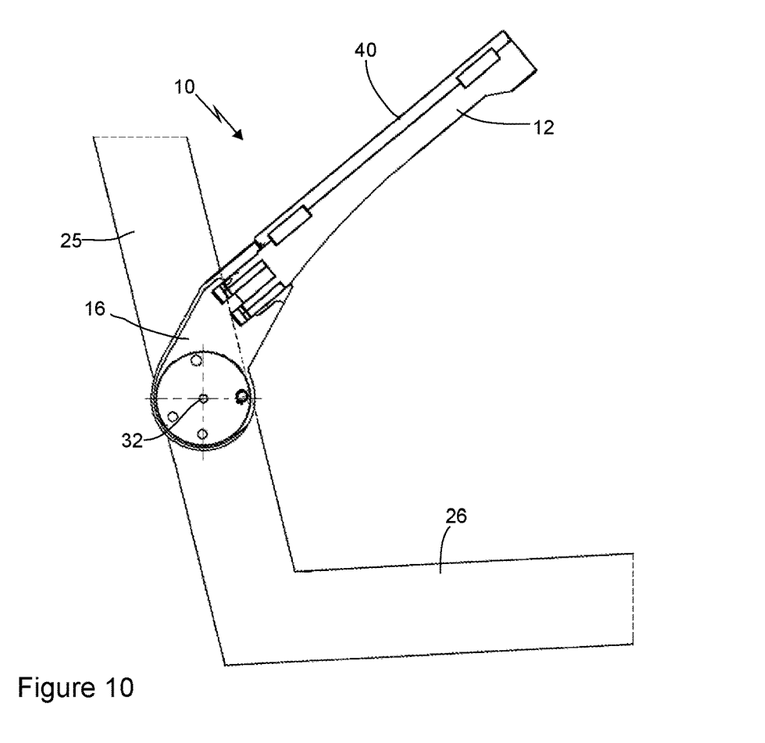
FIG. 10 shows a side view of the shared armrest of FIG. 2 in a partly stowed condition.

The hinge body 16 can be rotated about an axis 32 when lifting or lowering the armrest members 12, 14 to move them between stowed and deployed positions. FIG. 9 shows the shared armrest 10 in a deployed position. FIG. 10 shows the shared armrest 10 pivoted halfway between the stowed and deployed positions.

The armrest members 12, 14 swivel sideways from the hinge body 16 between the undivided and split conditions in a generally horizontal plane when the shared armrest 10 is in the deployed position. The hinge body 16 allows pivoting of the armrest members 12, 14 upwardly or downwardly in a generally vertical plane. The plane in which the hinge body 16 pivots the armrest members 12, 14 between the stowed and deployed positions is transverse to the plane in which the armrest members 12, 14 hinge or pivot from the hinge body 16. The axis 32 about which the hinge body 16 pivots is square relative to the swivel axis 28 of the armrest members 12, 14.

Figure 11:
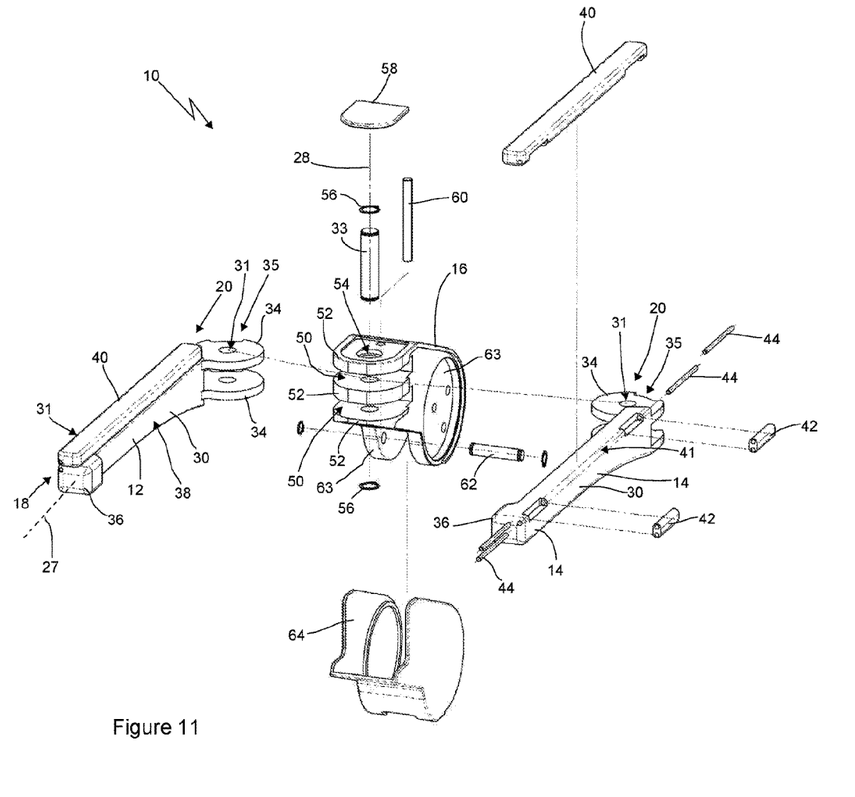
FIG. 11 shows a perspective exploded view of the shared armrest of FIG. 2.

FIG. 11 is an exploded view showing the different parts of the shared armrest 10.

The armrest members 12, 14 each comprise an arm 30 having disc-shaped knuckles 34 at the proximal end 20. The knuckles 34 have a central hole 31 for receiving a hinge pin 33. The knuckles 34 have arcuate or radiused end slots or recesses 35. The radiused end slots 35 are arcuate, peripheral recesses along the rearward ends of the knuckles 34. The arm is between 200 mm and 350 mm long, for example 272 mm, measured from the center of the hole 31 to the distal end 18.

The distal end 18 of the arm 30 has an enlarged end formation 36 which stands proud or is raised from a flat inwardly facing side 38 of the arm 30. The end formations 36 abut each other in the undivided condition of the armrest members 12, 14, keeping the inwardly facing sides 38 spaced slightly apart. The spacing between the inwardly facing sides 38 provides a gap 39 (shown in FIG. 4) between the sides 38 which is sufficient to allow a user to grip one of the armrest members 12, 14 to swing the armrest member 12, 14 out of the undivided condition. The gap 39 also reduces the likelihood of a pinch point or pinching when closing the armrest members 12, 14. The narrow part of the arm 30 is, for example, between 10 and 30 mm wide.

The armrest members 12, 14 include flap extensions 40. The flap extensions 40 are hingedly connected to the arms 30 by connecting blocks 42. The connecting blocks 42 are pivotally connected to the arms 30 and the flap extensions 40 by pins 44. The flap extensions 40 are folded on top of the arms 30 in the undivided condition. The flap extensions 40 can then be unfolded in the split condition to provide a wider surface area for supporting a passenger's forearm. The flap extensions 40 may also be unfolded in the undivided condition. The flap extensions are, for example, between 10 and 30 mm wide.

The flap extensions 40 are hingedly connected to the arm 30 along an outer edge 41 of the arm 30. Lateral sides of the flap extensions 40 bear against the outside of the arms 30 in the folded open condition to support the flap extensions 40 folded open. In the folded open condition the upwardly facing surface of the flap extension 40 is flush with the upwardly facing surface of the arm 30 to provide a generally continuous surface for supporting a person's arm.

The hinge body 16 defines gaps 50, between knuckles 52, in which the knuckles 34 of the armrest members 12, 14 are received. The knuckles 52 each have a central hole 54. The hinge pin 33 extends through the holes 54 in the knuckles 52 to capture the knuckles 34 of the armrest members 12, 14 received in the gaps 50 the hinge body 16. The knuckles 34 are thus interleaved with the knuckles 54 to provide a joint assembly in which vertical movement is inhibited.

The hinge body 16 includes circlips 56 at opposite ends of the hinge pin 33 to lock the hinge pin 33 in place. The hinge body 16 includes a top plate 58 received in a hollow of the topmost knuckle 52 to hide the hinge pin 33.

The hinge body 16 includes a stop formation in the form of a vertical stop pin 60. The stop pin 60 extends through gaps 50 to be located in the radius end slots 35 of the knuckles 34. Ends of the radiused recesses 35 butt against the stop pin 60, in use, to limit the range of swivelling of the armrest members 12, 14.

The hinge body 16 includes a horizontal stop pin 62. The stop pin 62 may abut a stop formation to limit downward travel of the shared armrest 10 in the vertical plane. The stop pin 62 may also be captured by a latch (not shown).

The hinge body 16 is supported relative to the seat in a pivotal manner by a bracket fixed to the seat or a frame of the row of seats. The hinge body 16 is hingedly mounted to the bracket. The hinge body 16 includes two spaced apart horizontally orientated disc formations 63 between which the bracket is seated to support the hinge body 16.

The shared armrest 10 includes a cover 64 which fits over the hinge body 16 for aesthetics.

The shared armrest 10 optionally includes a lock mechanism to lock the arm members 12, 14 in any position along its arc of pivotal movement. The lock mechanism may be activated by the weight of a person's arm bearing on the arm members 12, 14. The arm members 12, 14 may be biased to return to the undivided condition when not locked in place. The shared armrest 10 may thus include a biasing mechanism, such as a spring, to bias the arms to the undivided condition.

Figure 12:
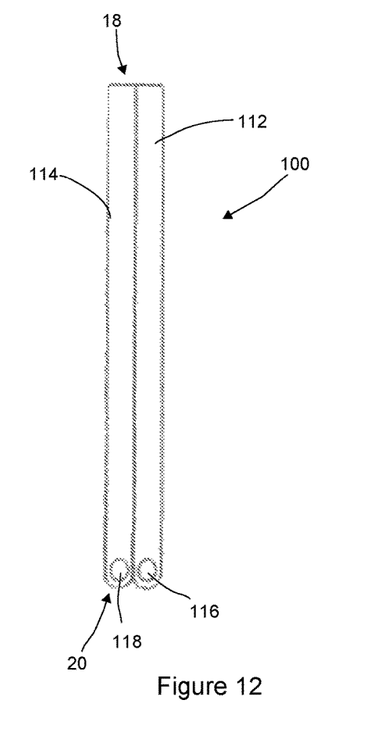
FIG. 12 shows a top view of another embodiment of a shared armrest in an undivided condition.
Figure 13:
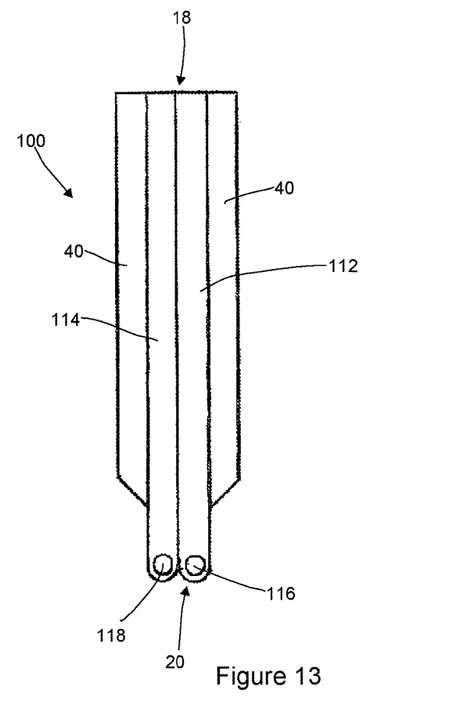
FIG. 13 shows a top view of the shared armrest of FIG. 12 in the undivided condition with flap portions folded open.
Figure 14:
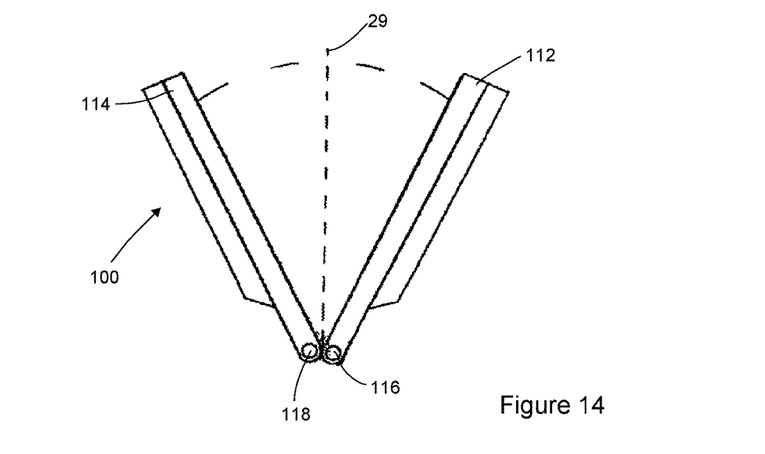
FIG. 14 shows a top view of the shared armrest of FIG. 13 in a split condition.
Figure 15:
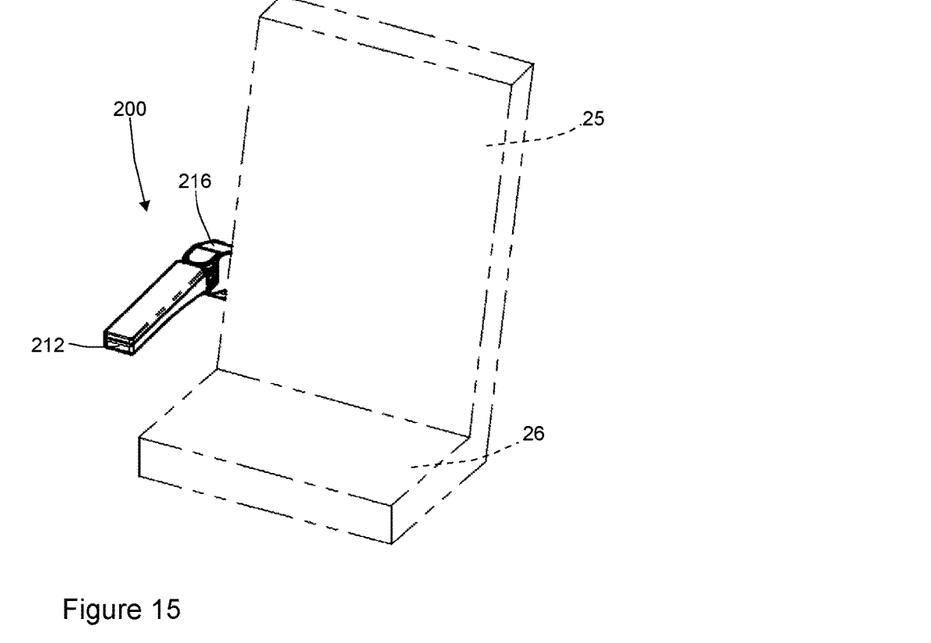
FIG. 15 shows a perspective view of a row terminating armrest at the end of a row of seats.
Figure 16:
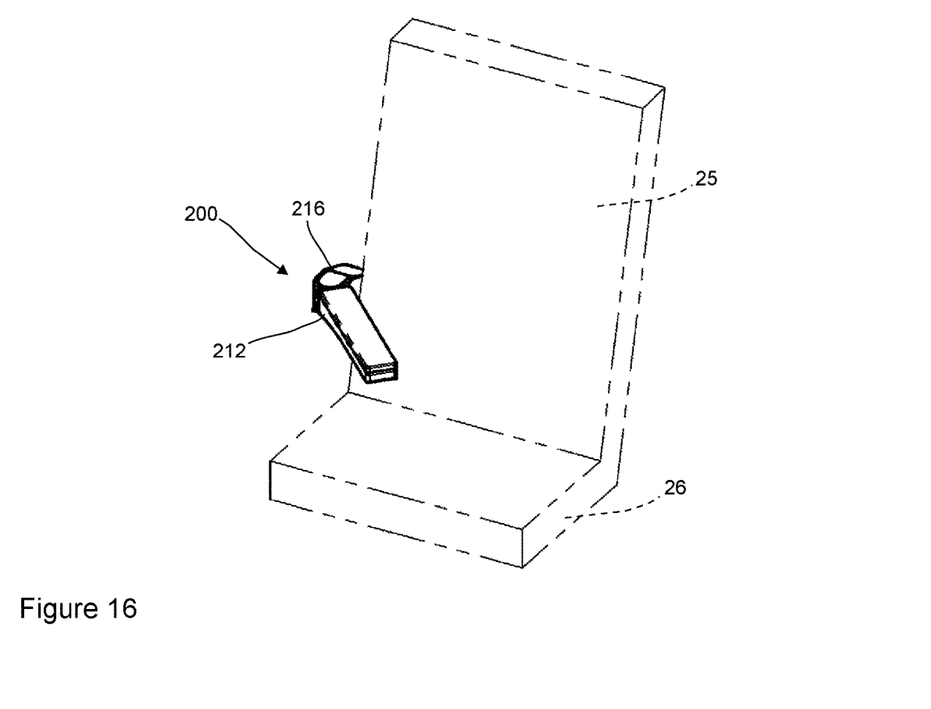
FIG. 16 shows a perspective view of the row terminating armrest of FIG. 15 swung inwardly.
Figure 17:
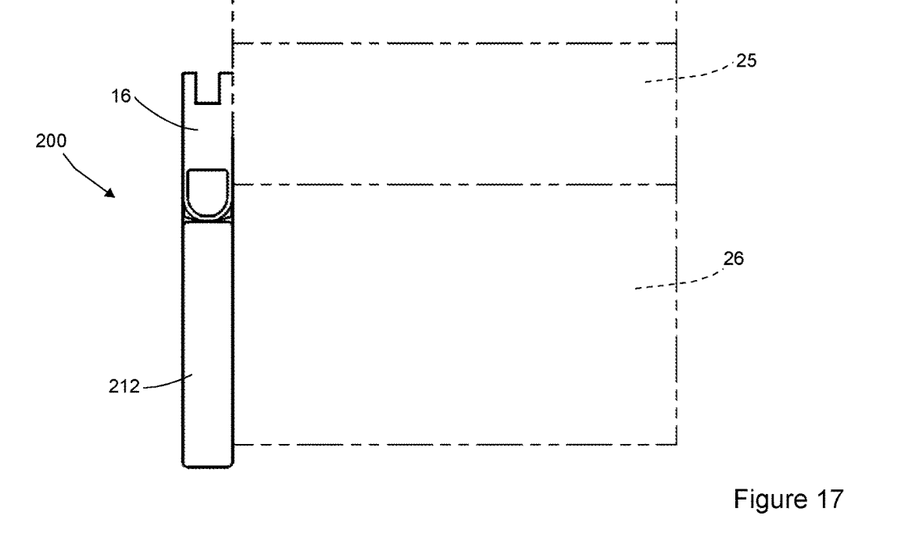
FIG. 17 shows a top view of the row terminating armrest in the condition of FIG. 15.
Figure 18:
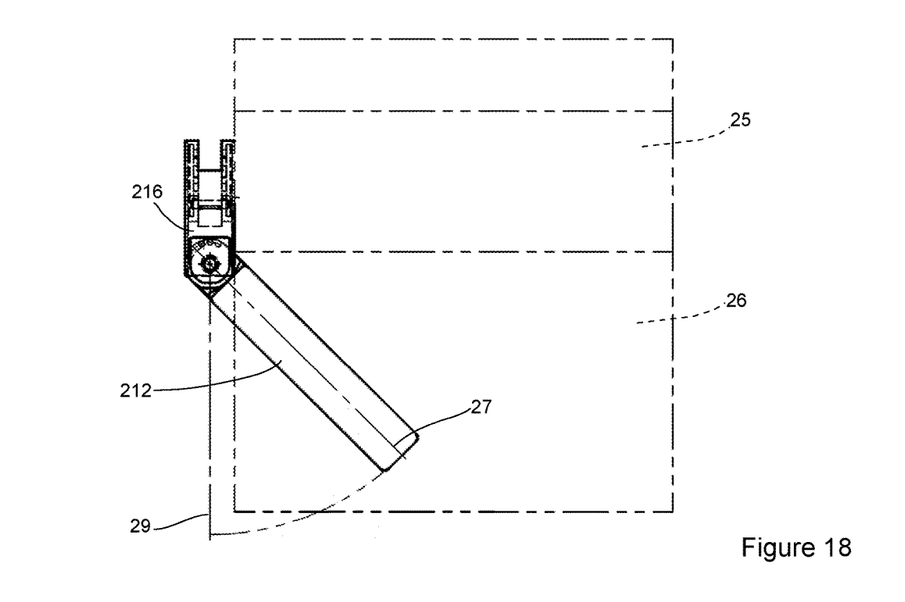
FIG. 18 shows a top view of the row terminating armrest pivoted inwardly into the condition of FIG. 16.
Figure 19:
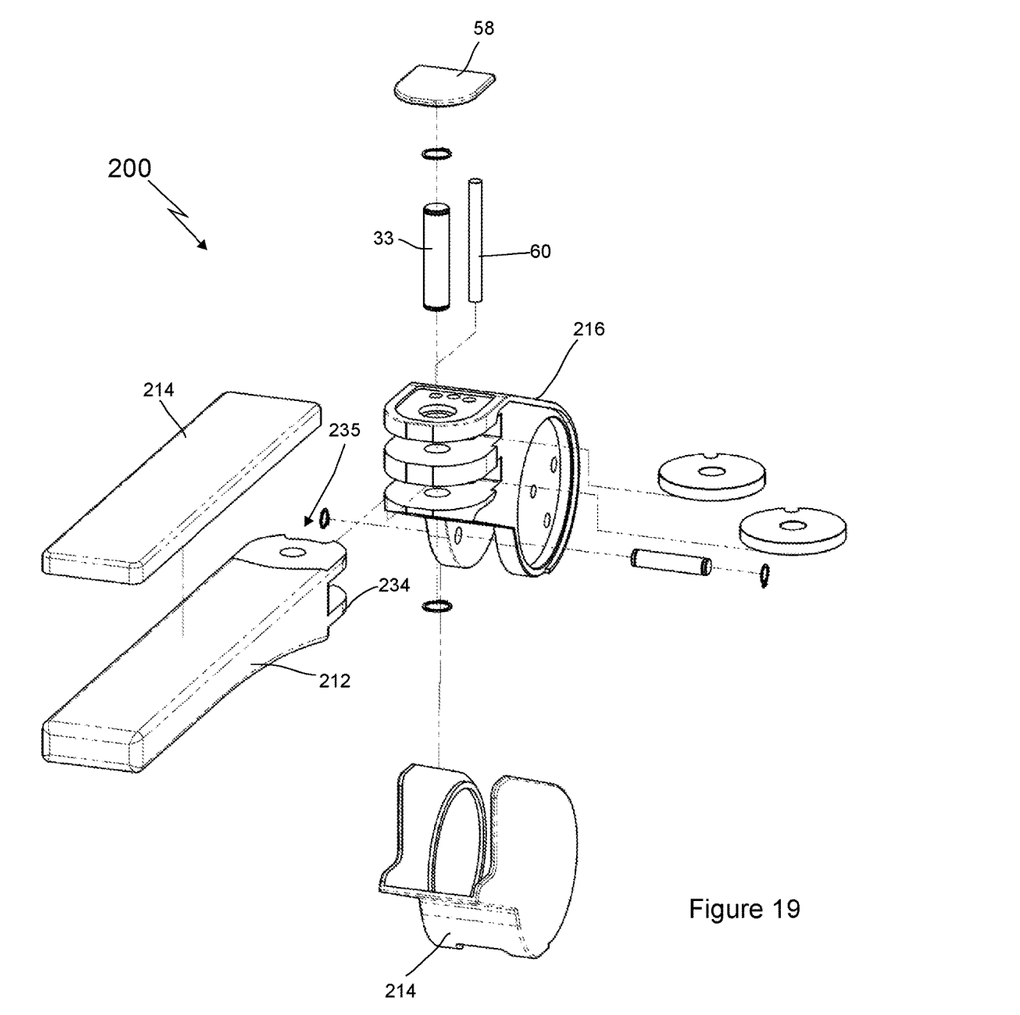
FIG. 19 shows a perspective exploded view of the row terminating armrest of FIG. 15.

FIGS. 12 to 14 show another embodiment of a shared armrest 100 with pivoted arm members 112, 114. With reference to the preceding drawings, like reference numbers refer to like parts, unless otherwise specified.

Whereas the shared armrest 10 has a common swivel axis 28 about which both arm members 12, 14 hinge, the arm members 112, 114 of the shared armrest 100 each pivot about their own respective swivel axes 116, 118. The swivel axes 116, 118 are toward the rear or proximal ends 20 of the arm members 112, 114.

FIGS. 15 to 19 show a row terminating armrest 200. The row terminating armrest 200 includes only a single pivoting arm member 212. The row terminating armrest 200 is hingedly displaceable in the horizontal plane between a centred position shown in FIG. 15 and an angled position shown in FIG. 16, wherein the armrest is angled inwardly toward the seatback 25.

The row terminating armrest 200 includes the same or similar hinge body 216 as the shared armrest 10. The armrest member 212 includes a cover 214. Knuckles 234 of the arm member 212 have radiused end slots or recesses 235. The vertical stop pin 60 can be located in one of three positions in the hinge body 216 to limit the arcuate displacement of the armrest 200. In one position of the stop pin 60, pivoting of the armrest member 212 is allowed in one direction away from the centred position only. In another position of the stop pin 60, pivoting of the armrest member 212 is allowed in an opposite direction away from the centred position only.

Figures 20, 21:
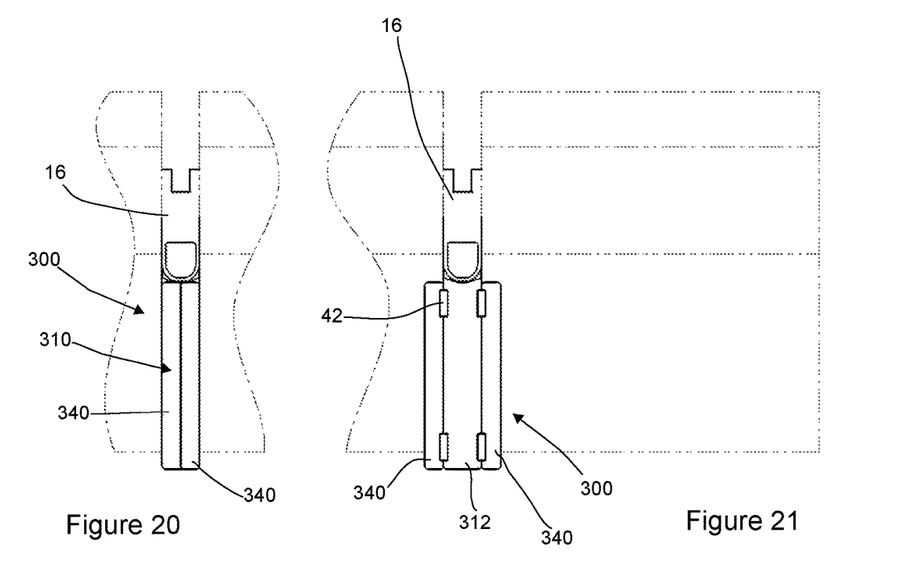
FIG. 20 shows a top view of a shared armrest with a folding cover.
FIG. 21 shows a top view of the shared armrest of FIG. 20 with the folding cover folded open.

FIG. 20 shows a shared armrest 300 including a fold-open cover 310. The cover 310 comprises two flap extensions 340. The flap extension 340 are hingedly connected to a central arm 312 of the armrest 300. The flap extensions 340 are hingedly connected to the armrest 300 in the same manner as the flap extensions 40 are hingedly connected to the armrests 12, 14 of the shared armrest 10.

Figure 22:
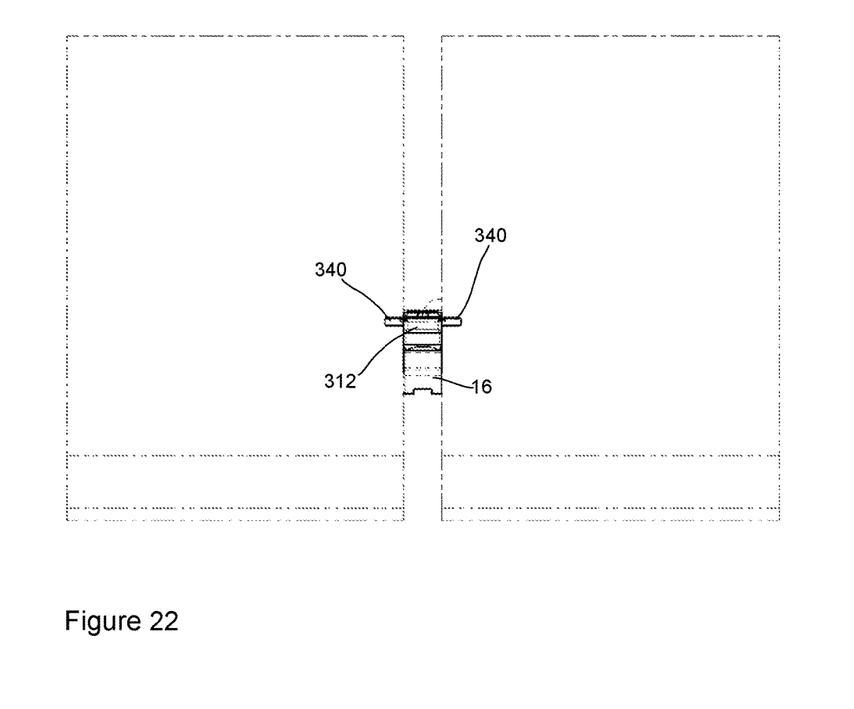
FIG. 22 shows a front view of the shared armrest of FIG. 20 with the folding cover folded open.

The flap extensions 340 can be folded out into the open position shown in FIGS. 21 and 22.

Figure 23:
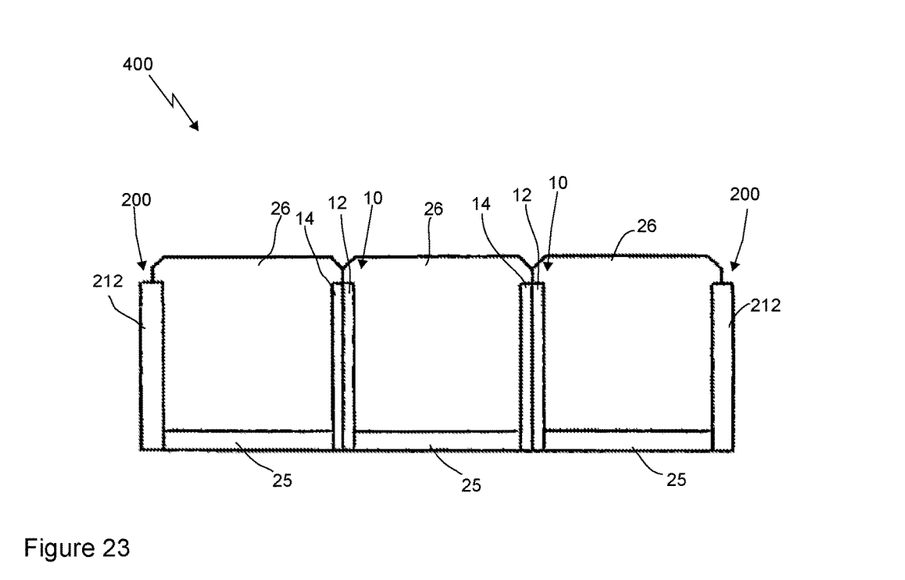
FIG. 23 shows a top view of a row of seats having the shared armrests of FIG. 2 between seats and the row terminating armrest of FIG. 15 at the ends of the row of seats.

FIG. 23 shows one example of a configuration or arrangement of a row 400 of seats 26 including armrests 10, 200. Neighbouring seats 26 share a shared armrest 10. Seats 26 at the ends of the row 400 include an outer row end armrest 200 at their outer sides.

Figure 24:
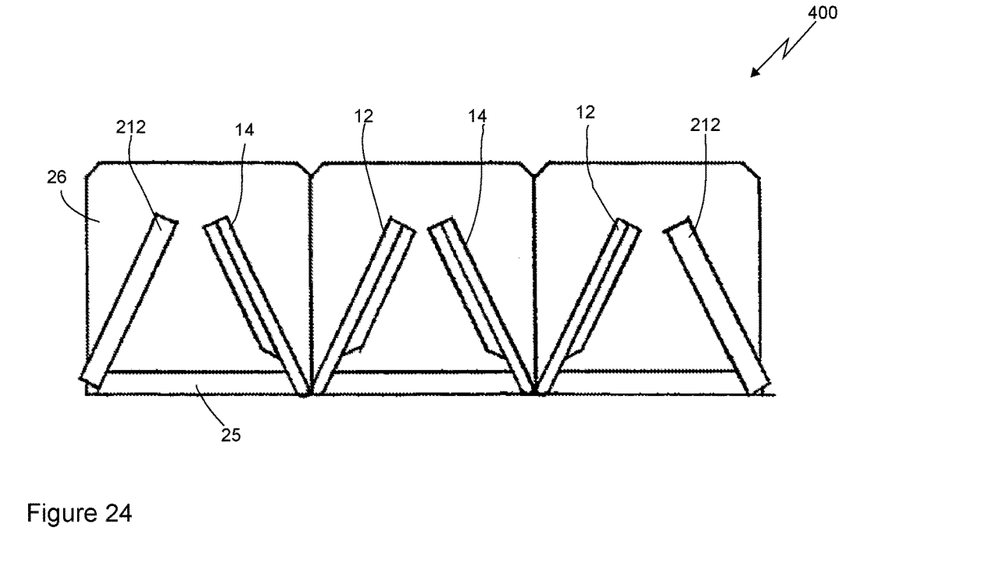
FIG. 24 shows the row of seats of FIG. 20 with the shared armrest in the split condition and the row terminating armrest pivoted inwardly.

The shared armrests 10 are shown in the undivided condition in FIG. 23 and in the split condition in FIG. 24. Similarly, the row terminating armrests 200 are shown in their centred positions in FIG. 23 and their angled-in positions in FIG. 24.

The shared armrest 10 provides for persons sitting abreast in adjacent seats to each have a distinct and separate support member, in the form of the arm members 12, 14 in the split condition, upon which to rest their forearms. The arm members 12, 14 angle inwardly towards the person in the seat in the split condition. Angling the arm members 12, 14 in means part of the arm members 12, 14 on which the forearm can be rested is in an ergonomically convenient position and spaced laterally from an adjacent arm member 12, 14 so that the two persons' arms do not interfere. The common swivel axes 28 about which the armrest members 12, 14 hinge or pivot are towards the back of the seats 26, so that angling the arm members 12, 14 in does not interfere with a torso of a person seated with their backs against the seatbacks 25.

The row of seats 26 having the shared armrest 10 finds application in many environments, including aircraft, trains, auditoriums and cinemas.

In the specification, including the claims, where the context permits, the term "comprising" and variants thereof such as "comprise" or "comprises" are to be interpreted as including the stated integer or integers without necessarily excluding any other integers.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

The use of words that indicate orientation or direction of travel is not to be considered limiting. Thus, words such as "front", "back", "rear", "side", "up", "down", "upper", "lower", "high"; "top", "bottom", "forwards", "backwards", "towards", "distal", "proximal", "in", "out"; "horizontal"; "vertical" and synonyms, antonyms and derivatives thereof have been selected for convenience only, unless the context indicates otherwise. The inventor envisages that various exemplary embodiments of the claimed subject matter can be supplied in any particular orientation and the claimed subject matter is intended to include such orientations.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

a. there is no requirement for the inclusion of any particular described or illustrated characteristic, function, activity, or element, any particular sequence of activities, or any particular interrelationship of elements;

b. no characteristic, function, activity, or element is "essential";

c. any elements can be integrated, segregated, and/or duplicated;

d. any activity can be repeated, any activity can be performed by multiple entities, and/or any activity can be performed in multiple jurisdictions; and e. any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values there between, such as for example, 1.1, 2.5, 3.335, 5, 6.179, 8.9999, etc., and includes all subranges there between, such as for example, 1 to 3.65, 2.8 to 8.14, 1.93 to 9, etc.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

The invention claimed is:

1. A shared armrest includes two armrest members, each of which is configured to support a person's arm, wherein
the shared armrest is configured so that at least one of the armrest members is displaceable between:
an undivided condition wherein the armrest members are together in a side-by-side arrangement, such that longitudinal axes of the armrest members are substantially parallel; and
a split condition wherein the armrest members diverge relative to each other with respective distal ends of the armrest members spaced apart from each other,
the shared armrest includes a hinge body, and the armrest members have a common axis about which the armrest members pivot with respect to the hinge body,
a flap extension is pivotally connected to each armrest member, each flap extension is pivotal between a folded position and an unfolded position, and each flap extension increases a surface area for supporting the person's arm when in the unfolded position, and
the flap extensions are configured to be in either of the folded position and the unfolded position when the corresponding armrest member is in either of the undivided condition and the split condition.

2. The shared armrest of claim 1, wherein proximal ends of the armrest members are connected to the hinge body.

3. The shared armrest of claim 2, wherein the hinge body is connectable to a seat or a frame in a hinged manner to provide hinged displacement of the armrest members in a plane transverse to a plane in which the armrest members pivot relative to each other.

4. The shared armrest of claim 1, wherein the hinge body includes knuckles, and proximal ends of the armrest members include knuckles, which are interleaved with the knuckles of the hinge body to provide a joint assembly in which vertical movement of the armrest members is inhibited.

5. The shared armrest of claim 1, wherein the armrest members have raised distal ends, which abut each other in the undivided condition to provide a gap between the armrest members.

6. The shared armrest of claim 1, wherein a range of pivoting of each armrest member is limited.

7. The shared armrest of claim 6, wherein the armrest members have knuckles at their proximal ends, and the knuckles have arcuate recesses in which a stop formation is received.

8. A row of seats including the shared armrest of claim 1 between adjacent seats.

9. The row of seats of claim 8, including a row terminating armrest, which is operable to swing inwardly toward a seatback of a row terminating seat.

10. A shared armrest includes two armrest members, each of which is configured to support a person's arm, wherein
the shared armrest is configured so that at least one of the armrest members is displaceable between:
an undivided condition wherein the armrest members are together in a side-by-side arrangement, such that longitudinal axes of the armrest members are substantially parallel; and
a split condition wherein the armrest members diverge relative to each other with respective distal ends of the armrest members spaced apart from each other,
the shared armrest includes a hinge body, and the armrest members pivot with respect to the hinge body,
a flap extension is pivotally connected to each armrest member, each flap extension is pivotal between a folded position and an unfolded position, and each flap extension increases a surface area for supporting the person's arm when in the unfolded position,
each flap extension pivots about an axis that extends in a longitudinal direction of a corresponding one of the armrest members, and
the flap extensions are configured to be in either of the folded position and the unfolded position when the corresponding armrest member is in either of the undivided condition and the split condition.

11. The shared armrest of claim 10, wherein proximal ends of the armrest members are connected to the hinge body.

12. The shared armrest of claim 11, wherein the hinge body is connectable to a seat or a frame in a hinged manner to provide hinged displacement of the armrest members in a plane transverse to a plane in which the armrest members pivot relative to each other.

13. The shared armrest of claim 10, wherein the hinge body includes knuckles, and proximal ends of the armrest members include knuckles, which are interleaved with the knuckles of the hinge body to provide a joint assembly in which vertical movement of the armrest members is inhibited.

14. The shared armrest of claim 10, wherein the armrest members have raised distal ends, which abut each other in the undivided condition to provide a gap between the armrest members.

15. The shared armrest of claim 10, wherein a range of pivoting of each armrest member is limited.

16. The shared armrest of claim 15, wherein the armrest members have knuckles at their proximal ends, and the knuckles have arcuate recesses in which a stop formation is received.

17. A row of seats including the shared armrest of claim 10 between adjacent seats.

18. The row of seats of claim 17, including a row terminating armrest, which is operable to swing inwardly toward a seatback of a row terminating seat.

19. A shared armrest includes two armrest members, each of which is configured to support a person's arm, wherein
the shared armrest is configured so that at least one of the armrest members is displaceable between:
an undivided condition wherein the armrest members are together in a side-by-side arrangement, such that longitudinal axes of the armrest members are substantially parallel; and
a split condition wherein the armrest members diverge relative to each other with respective distal ends of the armrest members spaced apart from each other,
proximal ends of the armrest members are connected in a pivotal manner to a hinge body, and
the hinge body includes knuckles, and the proximal ends of the armrest members include knuckles, which are interleaved with the knuckles of the hinge body, to provide a joint assembly in which vertical movement of the armrest members is inhibited.

20. A shared armrest includes two armrest members, each of which is configured to support a person's arm, wherein
the shared armrest is configured so that at least one of the armrest members is displaceable between:
an undivided condition wherein the armrest members are together in a side-by-side arrangement, such that longitudinal axes of the armrest members are substantially parallel; and
a split condition wherein the armrest members diverge relative to each other with respective distal ends of the armrest members spaced apart from each other,
the at least one of the armrest members is pivotally connected to a support structure or to the other armrest member,
a range of pivoting of the at least one of the armrest members is limited, and
the armrest members have knuckles at their proximal ends, and the knuckles have arcuate recesses in which a stop formation is received.

* * * * *